(12) United States Patent
Takaku et al.

(10) Patent No.: US 7,892,688 B2
(45) Date of Patent: Feb. 22, 2011

(54) FUEL CELL SYSTEM RUNNING ON HIGH PRESSURE GAS AND PROCESS FOR CONTROLLING THE SYSTEM

(75) Inventors: Koichi Takaku, Saitama (JP); Shuichi Togasawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1265 days.

(21) Appl. No.: 11/450,837

(22) Filed: Jun. 9, 2006

(65) Prior Publication Data

US 2006/0280978 A1 Dec. 14, 2006

(30) Foreign Application Priority Data

Jun. 9, 2005 (JP) ................ 2005-169022

(51) Int. Cl.
*H01M 8/00* (2006.01)
*H01M 8/04* (2006.01)

(52) U.S. Cl. .................. 429/442; 429/515; 429/428

(58) Field of Classification Search .......... 429/442, 429/515, 428
See application file for complete search history.

(56) References Cited

U.S. PATENT DOCUMENTS

| 5,366,820 | A * | 11/1994 | Tsutsumi et al. ............. 429/19 |
| 2004/0219398 | A1 * | 11/2004 | Calhoon ..................... 429/13 |
| 2005/0129998 | A1 * | 6/2005 | Okada et al. ................. 429/20 |

FOREIGN PATENT DOCUMENTS

JP        H07-018384 A    3/1995

* cited by examiner

*Primary Examiner*—Dah-Wei D Yuan
*Assistant Examiner*—Zachary Best
(74) *Attorney, Agent, or Firm*—Nelson Mullins Riley & Scarborough LLP; Anthony A. Laurentano

(57) ABSTRACT

Disclosed is a fuel cell system which includes a fuel cell, a high-pressure tank for containing a fuel, a supply device for delivering the fuel of the high-pressure tank to the fuel cell, a fuel consumption control mechanism for controlling an amount of the fuel consumed in the fuel cell, and a fuel temperature sensing device for sensing a temperature of the fuel discharged from the high-pressure tank. In this system, the amount of the consumed fuel is controlled based on the temperature sensed by the fuel temperature sensing device.

3 Claims, 6 Drawing Sheets

FUEL CELL SYSTEM RUNNING ON HIGH PRESSURE GAS AND PROCESS FOR CONTROLLING THE SYSTEM

CROSS-REFERENCE TO RELATED APPLICATIONS

This application claims the benefit of Japanese Patent Application 2005-169022 filed on Jun. 9, 2005, the disclosure of which is incorporated herein by reference.

BACKGROUND OF THE INVENTION

1. Field of the Invention

The present invention relates to a fuel cell system running on high pressure gas.

2. Description of the Related Art

A typical fuel cell system running on high pressure gas is equipped with a high pressure tank in which an isolation valve is installed, and this isolation valve is an in-tank electromagnetic valve. Such an isolation valve is positioned upstream of a regulator for depressurizing the high pressure gas. Furthermore, the valve is opened during the operation of the system, and is closed during the stop of the system. In this way, the supply of the fuel is blocked during the stop. In addition, if there should be any trouble in a device of the system, such as a regulator, positioned downstream of the isolation valve, the fuel could not flow out thereto. An example of an isolation valve of this type is described in Japanese Examined Patent Application Publication H7-18384.

However, the exemplified isolation valve has the following disadvantage. Assume that a system equipped with this isolation valve operates at a temperature nearly equal to the lower limit of its own guaranteed temperature range. If this system is connected to a heavy load, it consumes the high pressure gas rapidly. As a result, the temperature of the gas in the high pressure tank may drop below the lower limit of the guaranteed temperature range, because the isoentropic expansion occurs in the tank. This possibly causes the degradation of blocking property of the isolation valve, especially the property of seal section of the isolation valve.

Taking the above disadvantage into account, the present invention has been conceived. An object of the present invention is to provide a fuel cell system that has a function of preventing the degradation of all devices including a high pressure tank and a fuel cell, upon operation at low temperatures.

SUMMARY OF THE INVENTION

According to a first aspect of the present invention, there is provided, a fuel cell system comprising:

(a1) a fuel cell;

(a2) a high-pressure tank for containing a fuel;

(a3) a supply device for delivering the fuel of the high-pressure tank to the fuel cell;

(a4) a fuel consumption control mechanism for controlling an amount of the fuel consumed in the fuel cell; and (a5) a fuel temperature sensing device for sensing a temperature of the fuel discharged from the high-pressure tank, wherein the amount of the consumed fuel is controlled based on the temperature sensed by the fuel temperature sensing device.

According to a second aspect of the present invention, there is provided, the above fuel cell system further comprising:

(b1) an ambient temperature sensing device for sensing an ambient temperature of the fuel cell, wherein the fuel consumption control mechanism determines a minimum limit of the consumed fuel, based on the temperature sensed by the ambient temperature sensing device.

According to a third aspect of the present invention, there is provided, a vehicle equipped with the above fuel cell system.

According to a fourth aspect of the present invention, there is provided, a process for controlling a fuel cell system comprising a high-pressure tank, a fuel cell and a supply device, said process comprising:

(c1) sensing a temperature of gas discharged from the high pressure tank;

(c2) determining whether or not the sensed temperature is equal to/less than a predetermined limit value, and (c3) limiting an output of the fuel cell, based on the sensed temperature, if the sensed temperature is determined to be equal to/less than the predetermined limit value, wherein the predetermined limit value is set based on a minimum usable temperature of the high-pressure tank and a performance assurance temperature of the supply device.

According to a fifth aspect of the present invention, there is provided, the above process further comprising:

(d1) sensing an ambient temperature of the fuel cell before limiting the output of the fuel cell, if the sensed temperature of the gas is determined to be equal to/less than the predetermined limit value, wherein the limitation of the output of the fuel cell is further based on the sensed ambient temperature.

With the fuel cell system or the process according to the present invention, the amount of the fuel supplied to the fuel cell is decreased at low temperatures. This makes it possible to avoid the temperature drop of the fuel discharged from the high-pressure tank. Consequently, it is possible to prevent the supply device such as an isolation valve from being deteriorated.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

A fuel cell system according to embodiments of the present invention will be described in detail below, with reference to accompanying drawings. Note that the following description is given on the assumption that a fuel cell system is installed in a vehicle.

First Embodiment

Figure 1:
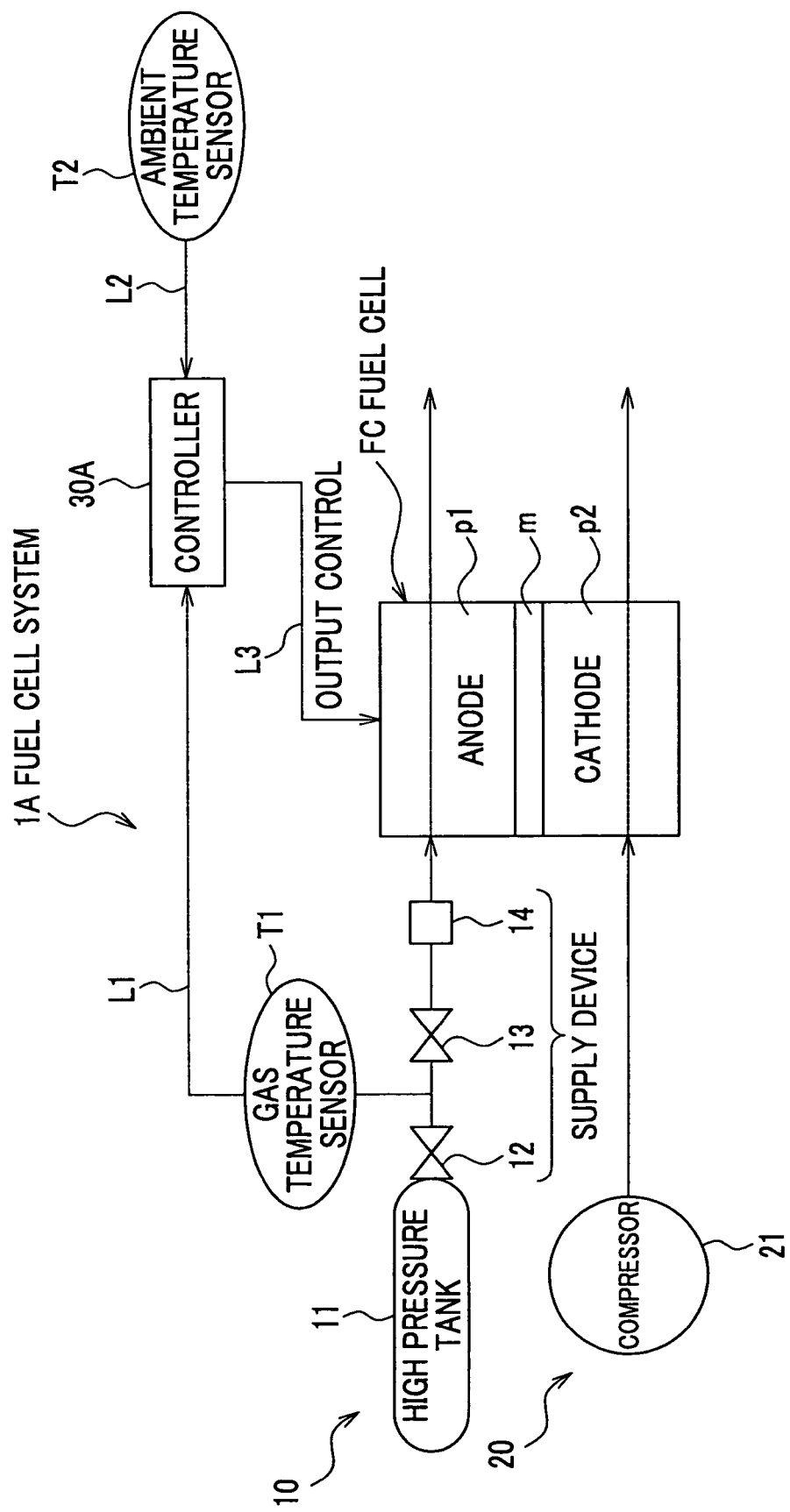
FIG. 1 is a view depicting a whole structure of a fuel cell system according to a first embodiment of the present invention.

Referring to FIG. 1, a fuel cell system 1A according to a first embodiment includes a fuel cell FC, a hydrogen supply mechanism 10, an air supply mechanism 20, a controller 30A, and temperature sensors T1 and T2.

The fuel cell FC is, for example, of a proton exchange membrane (PEM) type.

This type of fuel cell is fabricated in the follow steps:
1) placing a proton exchange membrane M between an anode p1 and a cathode p2 that both contain predetermined catalyzers, thereby forming a membrane electrode assembly (MEA),
2) putting the MEA between a pair of conductive separators (not shown), so that a unit cell is formed;
3) repeating the steps 1) and 2) several times until the desired number of unit cells are prepared; and
3) finally, stacking the multiple unit cells.

The hydrogen supply mechanism 10 supplies the anode p1 of the fuel cell FC with fuel, that is, hydrogen. This mechanism 10 includes, for example, a high-pressure tank 11, an isolation valve 12, a regulator 13 and a humidifier 14. Note that a combination of the components 12, 13 and 14 is called "a supply device" herein. The hydrogen supplied to the anode p1 is re-circulated by an ejector, etc., so that the fuel is prevented from being wasted.

The high-pressure tank 11 has an ability to contain hydrogen of high pressure such as 35 MPa (350 atm pressure). The isolation valve 12 is, for example, an in-tank electromagnetic valve. This valve 12 and the high-pressure tank 11 may be integrated. The regulator 13 depressurizes the high-pressure hydrogen discharged from the high-pressure tank 11. This regulator 13 may be constituted by multiple pressure reducing valves so as to depressurize the hydrogen in several stages. The humidifier 14 increases the moisture in the fuel cell FC in order to facilitate the reaction.

The air supply mechanism 20 supplies the cathode p2 of the fuel cell FC with an oxidizing agent, that is, air. This mechanism 20 includes a compressor 21, a cooler (not shown) and a humidifier (not shown). The compressor 21 is, for example, a motor-driven super charger, and it is placed upstream of the fuel cell FC. In addition, its motor rotational speed is controlled in accordance with a signal from the controller 30A as will be described later.

The fuel cell system 1A further includes a cooling mechanism composed of a radiator, circulating pump, etc. (not shown), and this cooling mechanism has the function of releasing heat generated by the fuel cell FC into the atmosphere.

The controller 30A includes a central processing unit (CPU) a read only memory (ROM), a random access memory (RAM), a peripheral circuit, and an I/O interface that are all not shown. This controller 30A controls the isolation valve 12 and the regulator 13 through a control bus (not shown). Furthermore, note that this controller 30A has a function of an output control mechanism herein.

The temperature sensor T1 senses the temperature of the hydrogen (gas temperature) discharged from the high-pressure tank 11 through the isolation valve 12. This sensor T1 is placed downstream of the isolation valve 12. Note that this temperature sensor T1 corresponds to a fuel temperature sensing device herein. The temperature sensor T1 may be configured to sense the interior temperature of the high-pressure tank 11, directly.

The temperature sensor T2 senses ambient temperature (surrounding temperature) of the fuel cell FC. Note that this temperature sensor T2 corresponds to an ambient temperature sensing device herein.

The temperature sensors T1 and T2 are connected to the controller 30A through signal buses L1 and L2, respectively. Accordingly, the gas temperature sensed by the temperature sensor T1 and the ambient temperature sensed by the temperature sensor T2 are inputted to the controller 30A.

In the fuel cell system 1A, the highly pressurized hydrogen is discharged from the high-pressure tank 11 while the isolation valve 12 is opened. Following this, the high-pressure hydrogen is depressurized to a predetermined value by the regulator 13, and is then delivered to the anode p1 of the fuel cell FC. In addition, the air compressed by the compressor 21 is cooled to a predetermined value by the cooler (not shown). Subsequently, the moisture of the air is increased to a predetermined value by the humidifier (not shown), and is then delivered to the cathode p2 of the fuel cell FC. As a result, the hydrogen and the oxygen contained in the air cause an electrochemical reaction in the fuel cell system 1A, thus producing electric power. The power (or current) outputted from the fuel cell FC is supplied to loads such as a motor (not shown) and a specific device (the compressor 21).

Hydrogen exhausted during the scavenging or purge process of the fuel cell FC is diluted to a predetermined concentration with air or purified water exhausted from the cathode of the fuel cell FC by a diluent device (not shown). Subsequently, the diluted hydrogen is exhausted from the vehicle.

Figure 2:
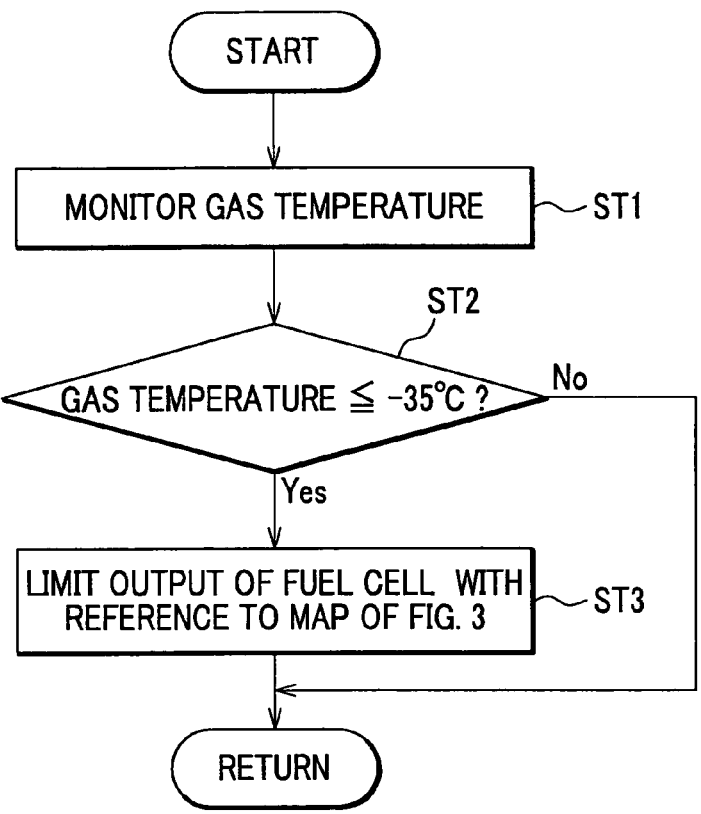
FIG. 2 is a flowchart of a process for controlling the output of a fuel cell in the fuel cell system.

Next, a description will be given below, of a process for controlling the output of the fuel cell FC in the fuel cell system 1A according to the first embodiment, with reference to FIGS. 2 and 3. In FIG. 2, each process step is represented by "ST". This process is aimed at protecting the isolation valve 12. In addition, assume that the performance assurance temperature of the isolation valve 12 is −40° C., and the output limitation starting temperature is −35° C. in the following description. It is obvious that the output limitation starting temperature is not limited to −35° C. and it can be any given value.

Consider a situation where a driver presses down on an accelerator suddenly in a vehicle equipped with the fuel cell system 1A. In this case, in order to speed up the vehicle suddenly, the high-pressure tank 11 discharges hydrogen abruptly, thus producing high power in the fuel cell FC. Then, it is known that the discharged hydrogen is cooled down. Accordingly, while the vehicle runs at low temperatures such as freezing temperatures, when the hydrogen is discharged from the high-pressure tank 11 suddenly, the temperature of the hydrogen is prone to drop below the performance assurance temperature (−40° C.). This may cause the deterioration of sealing of the isolation valve 12, thereby lacking the desired blocking function.

Figure 3:
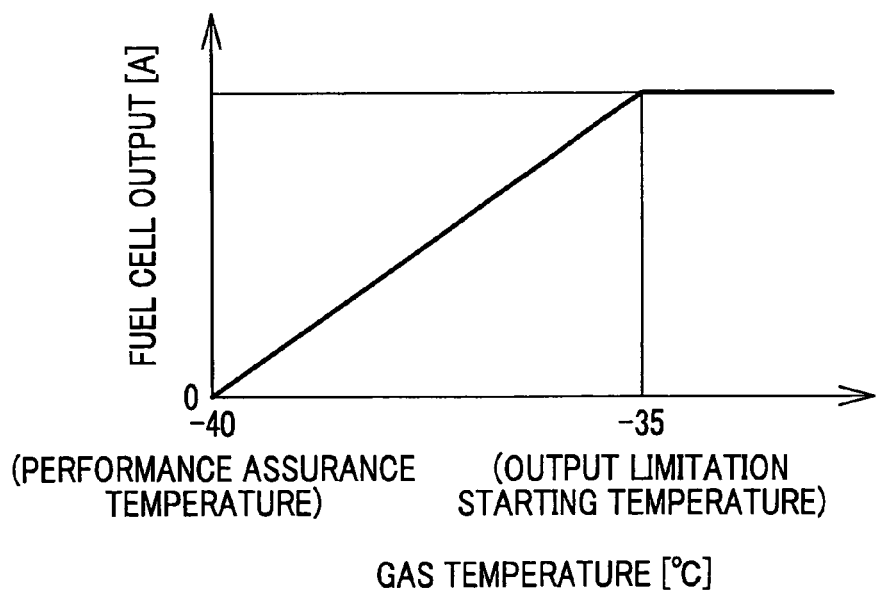
FIG. 3 is a map showing a relation between the gas temperature and the output of the fuel cell.

In order to prevent the isolation valve 12 from being deteriorated at low temperatures, the output of the fuel cell system 1A is controlled by carrying out a process shown in FIG. 2 with reference to a map of FIG. 3.

At a step 1 (ST1) of FIG. 2, the controller 30A keeps track of the gas (fuel) temperature of the hydrogen discharged from the high-pressure tank 11 via the temperature sensor T1. At a step 2 (ST2), the controller 30A determines whether or not the sensed gas temperature is equal to/less than −35° C. (output limitation starting temperature). If the gas temperature is determined to exceed −35° C. ("NO" at the step 2 (ST2)), then the process goes to the return, and returns to the step 1 (ST1).

Otherwise, if the gas temperature is determined to be equal to/less than −35° C. ("YES" at the step 2 (ST2)), then the process goes to a step 3 (ST3). At the step 3 (ST3), the controller 30A limits the output (maximum output) of the fuel cell FC with reference to the map of FIG. 3. The map of FIG. 3 indicates a relation between the output of the fuel cell FC and the gas temperature. A point at which the gas temperature is −35° C. is regard as a trigger point. After the reach of the trigger point, the controller 30A limits the output (maximum output), little by little. In this case, the controller 30A sends, to the fuel cell FC through a control bus L3 (see FIG. 1), a control signal to direct the decrease in the power.

As described above, in the fuel cell system 1A of the first embodiment, the power produced by the fuel cell FC is limited, so that the amount of the fuel discharged from the high-pressure tank 11 is decreased. This makes it possible to prevent the sudden drop of the gas temperature, whereby the isolation valve 12 is not deteriorated. Alternatively, in order to limit the output of the fuel cell FC, the power consumption of each device may be decreased, instead of the power produced by the fuel cell FC.

With the above control process for the fuel cell system 1A, the isolation valve 12 can be prevented from being deteriorated. However, this control process limits the output of the fuel cell FC, only based on the temperature sensed by the temperature sensor T1. Hence, the process may cause the excess limitation of the output. This is because thermal energy which is transferred to the high-pressure tank 11 from its external can be changed depending on the physical property of the high-pressure tank 11 such as material, etc. Specifically, if the gas temperature reaches −40° C., the output is set to zero as shown in FIG. 3. In other words, the vehicle fails to run. In order to overcome this disadvantage, the minimum limit of output of the fuel cell FC simply needs to be set, based on a relation of FIG. 4A.

Figure 4A:
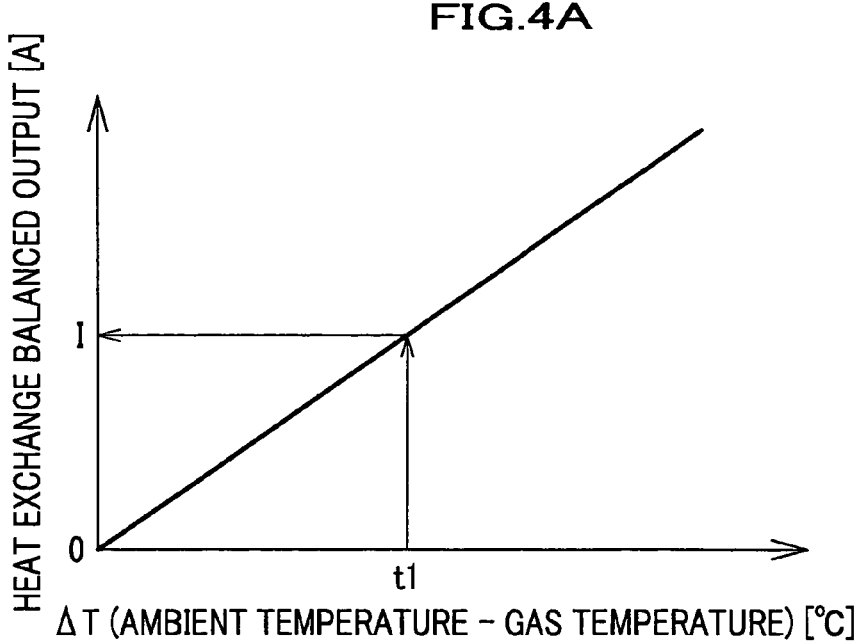
FIG. 4A is a graph showing a relation between a heat exchange balanced output and a temperature difference obtained by subtracting the gas temperature from the ambient temperature.
Figure 4B:
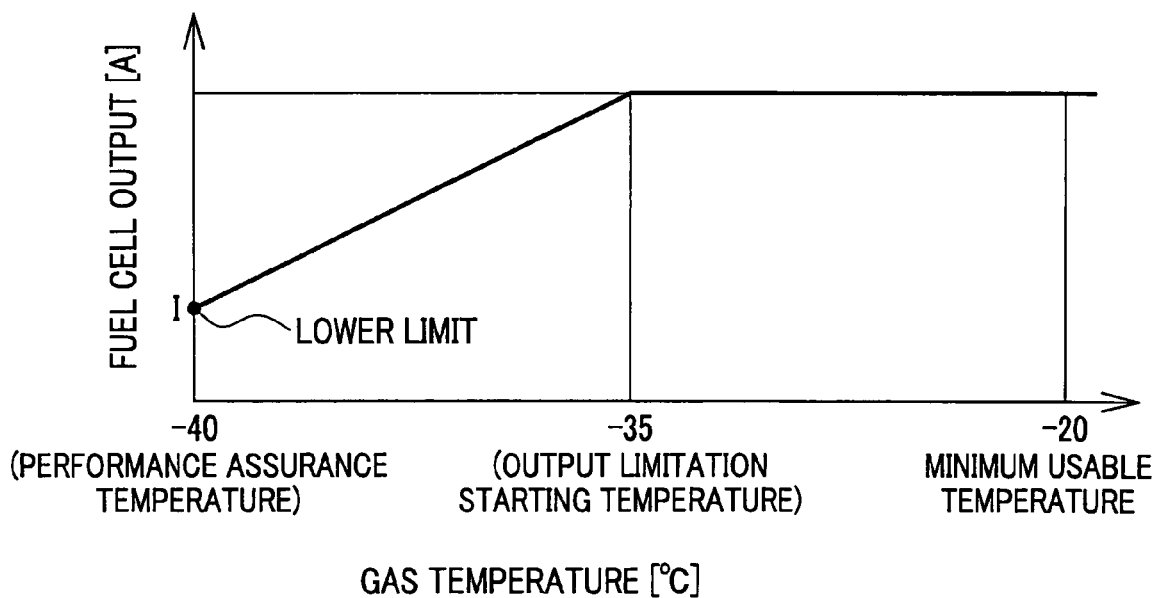
FIG. 4B is a map showing a relation between the gas temperature and the output of the fuel cell.

Referring to FIG. 4A, a symbol Δt indicates a temperature difference obtained by subtracting the gas temperature sensed by the temperature sensor T1 from the ambient temperature sensed by the temperature sensor T2. Furthermore, a heat exchange balanced output of this map means the output of the fuel cell system 1A under the condition that first thermal energy equals to second thermal energy. The first thermal energy refers to thermal energy which the high-pressure tank 11 loses during the discharge of hydrogen. The second thermal energy refers to thermal energy which the fuel in the high-pressure tank 11 receives through the tank 11 at ambient temperatures. In FIG. 4A, the ambient temperature in Δt is substituted by minimum usable temperature which a vehicle equipped with the fuel cell FC guarantees. Moreover, the gas temperature in Δt is substituted by performance assurance temperature of the isolation valve 12. This is how, it is possible to determine the minimum limit of the fuel consumed by the fuel cell FC. To give an example, consider a case where the minimum ambient temperature is −20° C., and the performance assurance temperature of the isolation valve 12 is −40° C. In this case, the temperature difference Δt is 20° C., which is represented by "t1" in FIG. 4A. The heat exchange balanced output at t1, that is, the minimum limit corresponds to "l" in FIG. 4A. As a result, a map shown in FIG. 4B is obtained. The output of the fuel cell FC can be controlled based on this map.

As described above, the minimum limit of the fuel consumed by fuel cell FC is determined based on both the minimum ambient temperature and the performance assurance temperature of the isolation valve 12. Consequently, it is possible to prevent the output of the fuel cell FC from being limited excessively. This makes it possible to avoid an incident in which a vehicle equipped with the fuel cell FC fails to run, or in which the running performance is limited excessively.

Figure 5:
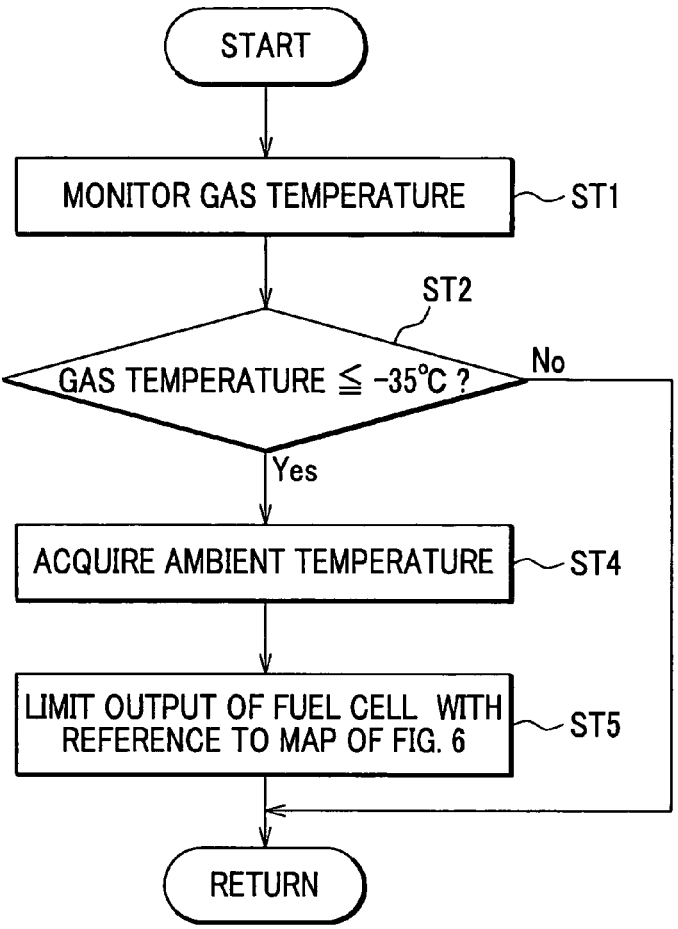
FIG. 5 is a flowchart of an alternative process for controlling the output of a fuel cell in the fuel cell system.

Moreover, a process shown in FIG. 5 may also be applied to a process for controlling the fuel cell system 1A. FIG. 5 shows a flowchart of a process for controlling the output of the fuel cell, and this process differs from that of FIG. 2 in that new steps 4 (ST4) and 5 (ST5) are executed, instead of the step 3 (ST3).

Figure 6:
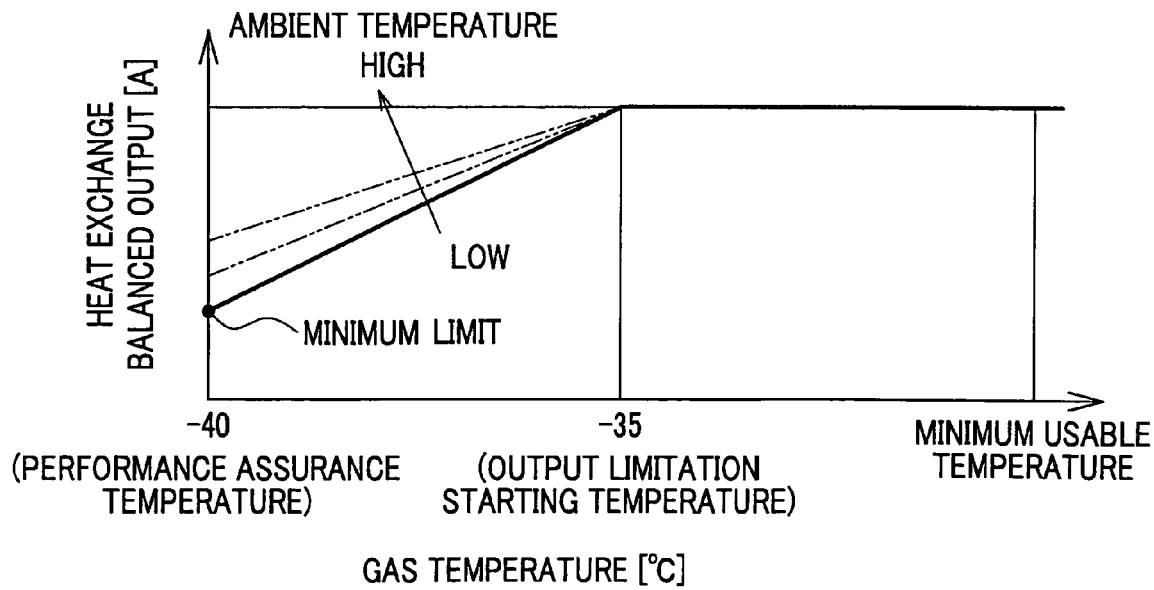
FIG. 6 is a map showing a relation between the gas temperature and the output of the fuel cell.

In the process of FIG. 5, if determining that the gas temperature is equal to/less than −35° C. ("Yes" at the step 2 (ST2)), then the controller 30A (see FIG. 1) acquires the ambient temperature via the temperature sensor T2 at a step 4 (ST4). Subsequently, the controller 30A limits the output (maximum output) of the fuel cell FC with reference to a map of FIG. 6 at a step 5 (ST5). The map of FIG. 6 is basically similar to that of FIG. 3, but it differs in that the minimum limit can be changed depending on the ambient temperature. Referring to FIG. 6, as the ambient temperature is lower, the minimum limit is set to a lower value. Meanwhile, as the ambient temperature is higher, the minimum limit is set to a higher value. Therefore, the output of the fuel cell FC can be prevented from being limited excessively. This makes it possible to eliminate an incident in which the running performance is deteriorated or is limited excessively.

Second Embodiment

Figure 7:
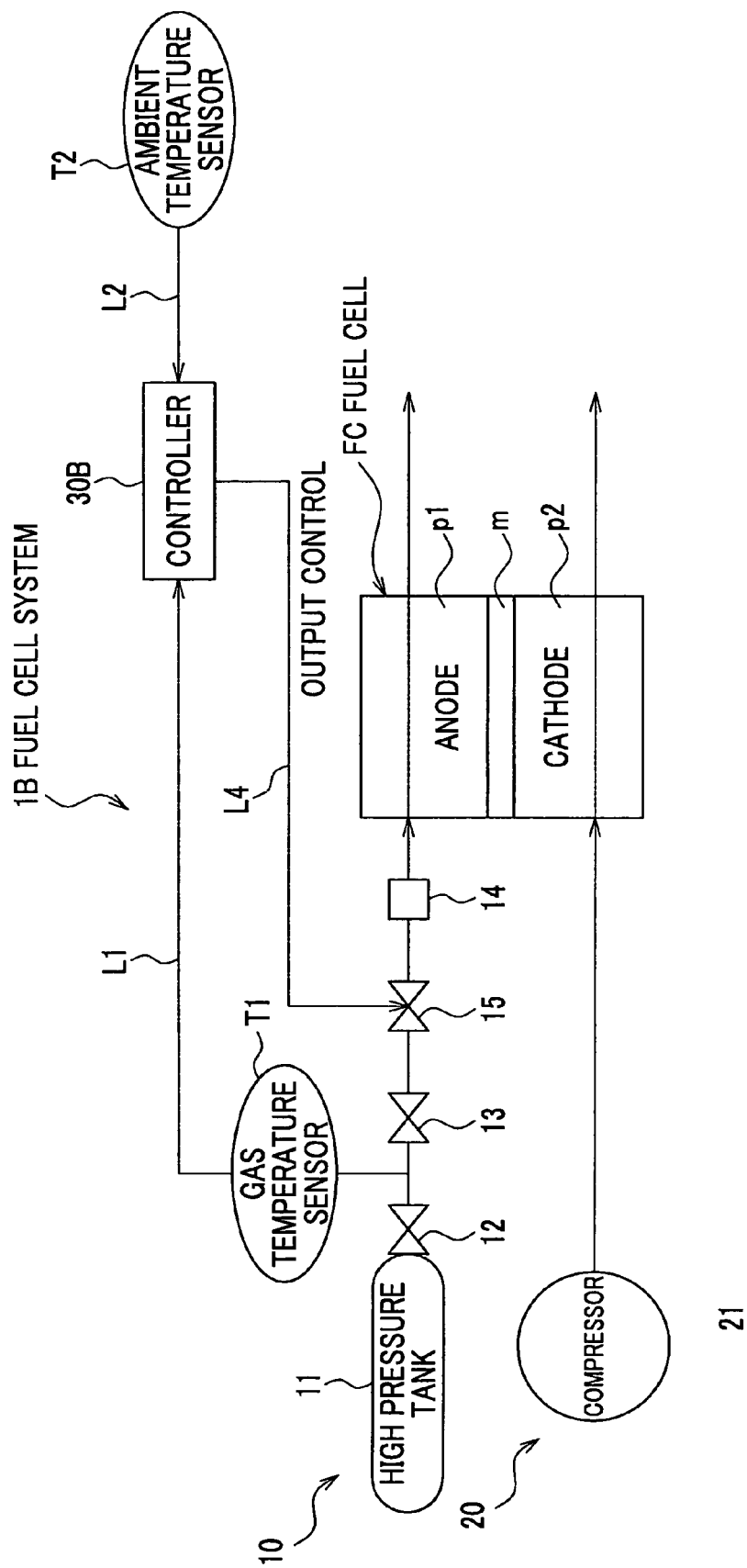
FIG. 7 is a view depicting a whole structure of a fuel cell system according to a second embodiment of the present invention.

Referring to FIG. 7, a fuel cell system 1B according to a second embodiment of the present invention differs from the fuel cell system 1A according to the first embodiment (see FIG. 1) in that it includes a fuel supply control mechanism, instead of the output control mechanism. Other structures of the system according to the first embodiment are similar to those of the second embodiment. The same reference numerals are given to the same parts as those already described in the first embodiment, and duplicate description therefore is omitted.

The fuel supply control mechanism includes a gas supply control valve 15 and a controller 30B. The gas supply control valve 15 may be implemented by variable orifice or ON/OFF type shunt-off valve. It is placed between the regulator 13 and the humidifier 14. If an ON/OFF type shunt-off valve is used, then it turns ON/OFF to thereby control the amount of the fuel supplied to the fuel cell FC.

Figure 8:
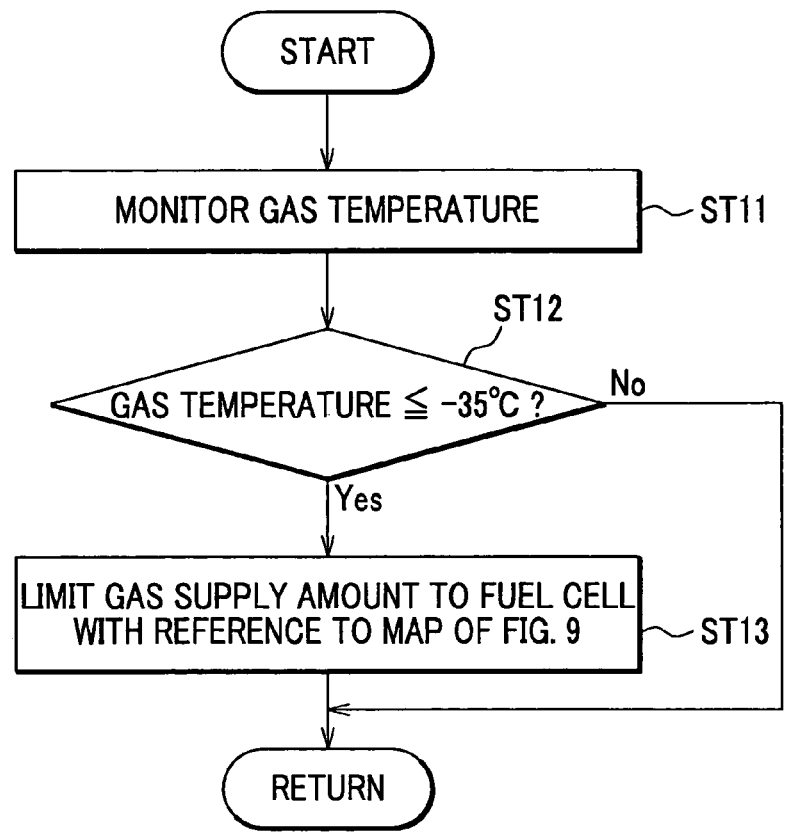
FIG. 8 is a flowchart of a process for controlling the fuel supplied to the fuel cell.
Figure 9:
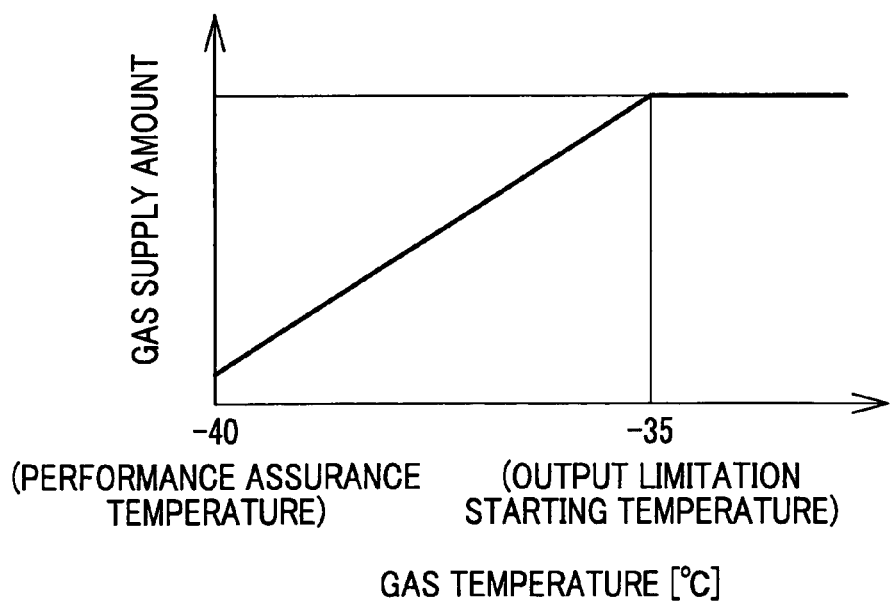
FIG. 9 is a map showing a relation between the gas temperature and the gas supply amount.

Next, a description will be given below, of a process for controlling the fuel supplied to the fuel cell system 1B of, the second embodiment. Referring to FIG. 8, at a step 11 (ST11), the controller 30B keeps track of the temperature of hydrogen (fuel) discharged from the high-pressure tank 11 via the temperature sensor T1. Following this, at the step 12 (ST12), the controller 30 determines whether or not the gas temperature falls below an output limitation starting temperature of −35° C. If the gas temperature is determined to less than −35° C. ("Yes" at the step 12 (ST12)), then the controller 30 limits the amount of the gas (fuel) supplied to the fuel cell FC with reference to a map of FIG. 9, at a step 13 (ST13). FIG. 9 shows a relation between the gas temperature and the gas supply amount. The controller 30 starts limiting the gas supply amount at the time when the gas temperature reaches −35° C., that is, a trigger point. In order to limit the gas, the controller 30B sends a control signal to the gas supply control valve 15 through a control bus L4.

In this way, the gas supplied to the fuel cell FC is limited in the fuel cell system 1B. This makes it possible to prevent the sudden drop of the temperature of the gas discharged from the high-pressure tank 11. In other words, it is possible to prevent the deterioration of the isolation valve 12 at low temperatures.

Alternatively, in the second embodiment, the controller 30B may map the relation between the gas supply amount and both the gas temperature and the ambient temperature, in the way similar to that of the first embodiment. In this case, when the ambient temperature is low, the minimum limit of gas supply amount may be set to a low value. Otherwise, when the ambient temperature is high, the minimum limit may be set to be a high value.

In the above two embodiments, for the purpose of protecting the supply device, the isolation valve 12 is guarded. However, the present invention is not limited thereto. For example, assume that the regulator 13 is inferior to the isolation valve 12 and the humidifier 14 in low-temperature property. In this case, the output of the fuel cell FC or the gas supplied to the fuel cell FC may be controlled to protect the regulator 13. In addition, if the humidifier 14 is inferior in low-temperature property, then the control may be done in order to protect the humidifier 14. Furthermore, the position of the temperature sensor T1 may be changed depending on the type of the supply device, that is, an object to be protected. For example, when the humidifier 14 is an object to be protected, the temperature sensor T1 may be placed between the regulator 13 and the humidifier 14.

In the above two embodiments, the description has been given based on the premise that the fuel cell system is applied to a vehicle. However, the application of the present invention is not limited thereto. Alternatively, the application of the fuel system may be electrical household appliances. In this case, this system may be of a stationary type. When the fuel cell system is applied to an electrical household appliance, the minimum limit of the gas supply amount ought to be changed depending on the ambient temperature. This enables the power production performance of the fuel cell to be prevented from dropping excessively.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A process for controlling a fuel cell system comprising a high-pressure tank which contains hydrogen to be discharged, the contained hydrogen in the high-pressure tank being depressurized and cooled with the hydrogen being discharged, a fuel cell and a supply device having a function for isolating or depressurizing the hydrogen discharged from the high pressure tank, the supply device including a member for isolating the hydrogen discharged from the high pressure tank based on a performance assurance temperature, said process comprising:

sensing a temperature of gas discharged from the high pressure tank or gas in the high pressure tank;

determining whether or not the sensed temperature is equal to/less than a predetermined limit value which is determined based on the performance assurance temperature; and limiting an output of the fuel cell and controlling an amount of the hydrogen discharged from the high pressure tank, based on the sensed temperature, if the sensed temperature is determined to be equal to/less than the predetermined limit value, so that the sensed temperature does not fall below the performance assurance temperature of the supply device.

2. The process according to claim 1, further comprising:

sensing an ambient temperature of the fuel cell before limiting the output of the fuel cell, if the sensed temperature of the gas is determined to be equal to/less than the predetermined limit value, wherein the limitation of the output of the fuel cell is further based on the sensed ambient temperature.

3. The process according to claim 1, wherein the limited output of the fuel cell is changed depending on the ambient temperature of the fuel cell.

* * * * *